United States Patent [19]

Schmerling

[11] 3,853,916

[45] Dec. 10, 1974

[54] ALKYLATION OF ETHERS
[75] Inventor: Louis Schmerling, Riverside, Ill.
[73] Assignee: Universal Oil Products Company, Des Plaines, Ill.
[22] Filed: June 12, 1972
[21] Appl. No.: 261,891

[52] U.S. Cl......... 260/340.6, 260/340.7, 260/345.1, 260/346.1 R, 260/611 R, 260/614 A, 260/614 R
[51] Int. Cl............................................ C07d 15/12
[58] Field of Search........... 260/340.6, 340.7, 347.8, 260/611 R, 614 A, 614 R

[56] References Cited
OTHER PUBLICATIONS
Wallace, et al.; "Chemical Abstracts," Vol. 59, (1963), Col. 3914e.
Shuikin et al., "Chemical Abstracts," Vol. 66, (1967), Col. 55321y.
Shuikin, et al., "Chemical Abstracts," Vol. 68, (1968), Col. 29524p.

Primary Examiner—Joseph A. Narcavage
Assistant Examiner—James H. Turnipseed
Attorney, Agent, or Firm—James R. Hoatson, Jr.; Raymond H. Nelson; William H. Page II

[57] ABSTRACT

Alkyl ethers or saturated cyclic ethers may be alkylated by treatment with an unsaturated hydrocarbon in the presence of a catalyst comprising a free-radical generating compound and a promoter comprising a hydrogen compound at a temperature at least as high as the decomposition temperature of said free-radical generating compound.

9 Claims, No Drawings

ALKYLATION OF ETHERS

This invention relates to a process for the alkylation of an ether and more specifically to a process whereby an alkyl ether or saturated cyclic ether may be alkylated by treatment with an unsaturated hydrocarbon in the presence of certain compounds of a type hereinafter set forth in greater detail.

Ethers, whether alkyl or saturated cyclic ethers, will find a wide variety of uses in the chemical field. The saturated cyclic ethers including, for purpose of this invention, both mono-ethers and polyethers, containing alkyl or polyalkyl substituents on the ring may be used as intermediates in the preparation of pharmaceuticals, cosmetics, deodorants, plastics, paints, varnishes, etc., the alkyl substituents on the ring endowing the finished compound with desirable properties.

It is therefore an object of this invention to provide a process for preparing alkylated alkyl ethers or saturated cyclic ethers possessing higher molecular weight than the original starting material.

A further object of this invention is to provide a process for alkylating saturated ethers, either alkyl or cycloalkyl in configuration by treatment of the ether with an unsaturated hydrocarbon.

In one aspect an embodiment of this invention resides in a process for the alkylation of an alkyl ether or a saturated cyclic ether which comprises treating said ether with an unsaturated hydrocarbon in the presence of a catalyst comprising a free-radical generating compound and a promoter comprising a hydrogen chloride compound at reaction conditions, and recovering the resultant alkylated ether.

A specific embodiment of this invention is found in a process for the alkylation of a saturated cyclic ether which comprises treating 1,4-dioxane with ethylene in the presence of di-t-butyl peroxide and hydrochloric acid at a temperature in the range of from about the decomposition temperature of said di-t-butyl peroxide to about 150° C. higher than said decomposition temperature, and recovering the resultant ethyl-1,4-dioxane.

Other objects and embodiments will be found in the following further detailed description of the present invention.

As hereinbefore set forth the present invention is concerned with a process for the alkylation of ethers, and particularly to the treatment of an alkyl ether or a saturated cyclic ether with an unsaturated compound in the presence of a catalyst comprising a free-radical generating compound and a promoter comprising a hydrogen chloride compound. Suitable ethers which may be subjected to the alkylation process of the present invention include in particular those which contain at least 1 hydrogen atom attached to a primary or secondary carbon atom. Specific examples of these ethers include the alkyl (which for the purposes of this application includes cycloalkyl) ethers both symmetrical and unsymmetrical, in nature such as ether, n-propyl ether, isopropyl ether, n-butyl ether, sec-butyl ether, t-butyl ether, n-amyl ether, sec-amyl ether, n-heptyl ether, sec-heptyl ether, n-octyl ether, sec-octyl ether, ethyl n-propyl ether, ethyl isopropyl ether, ethyl n-butyl ether, ethyl sec-butyl ether, ethyl n-amyl ether, n-propyl isopropyl ether, n-propyl n-butyl ether, n-propyl sec-butyl ether, n-propyl n-amyl ether, n-propyl sec-amyl ether, ethyl cyclohexyl ether, dicylohexyl ether, propyl cyclopentyl ether, etc.; saturated cyclic ethers such as tetrahydrofuran, tetrahydropyran, 1,3-dioxane, 1,4-dioxane, etc.; alkyl-substituted saturated cyclic ethers such as 2-methyltetrahydrofuran, 3-methyltetrahydrofuran, 2-ethyltetrahydrofuran, 3-ethyltetrahydrofuran, 2-n-propyltetrahydrofuran, 3-n-propyltetrahydrofuran, 2-isopropyltetrahydrofuran, 3-isopropyltetrahydrofuran, 1,2-dimethyltetrahydrofuran, 2,4-dimethyltetrahydrofuran, 2,3-diethyltetrahydrofuran, 2,4-diethyltetrahydrofuran, 2,3-di-n-propyltetrahydrofuran, 2,3-diisopropyltetrahydrofuran, 2-methyltetrahydropyran, 3-methyltetrahydropyran, 4-methyltetrahydropyran, 2-ethyltetrahydropyran, 3-ethyltetrahydropyran, 4-ethyltetrahydropyran, 2-N-propyltetrahydropyran, 3-n-propyltetrahydropyran, 4-n-propyltetrahydropyran, 2-isopropyltetrahydropyran, 3-isopropyltetrahydropyran, 4-isopropyltetrahydropyran, 2-n-butyltetrahydropyran, 3-n-butyltetrahydropyran, 4-n-butyltetrahydropyran, 2-t-butyltetrahydropyran, 3-t-butyltetrahydropyran, 4-t-butyltetrahydropyran, 2,3-dimethyltetrahydropyran, 2,4-dimethyltetrahydropyran, 2,3-diethyltetrahydropyran, 2,4-diethyltetrahydropyran, 2,3-di-n-propyltetrahydropyran, 2,4-di-n-propyltetrahydropyran, 2-methyl-1,3-dioxane, 4-methyl-1,3-dioxane, 2-ethyl-1,3-dioxane, 4-ethyl-1,3-dioxane, 2-n-propyl-1,3-dioxane, 4-n-propyl-1,3-dioxane, 2-isopropyl-1,3-dioxane, 4-isopropyl-1,3-dioxane, 2-methyl-1,4-dioxane, 2,3-dimethyl-1,4-dioxane, 2-ethyl-1,4-doxane, 2,3-diethyl-1,4-dioxane, 2-n-propyl-1,4-dioxane, 2,3-di-n-propyl-1,4-dioxane, 2-isopropyl-1,4-dioxane, 2,3-diisopropyl-1,4-dioxane, etc. It is to be understood that the aforementioned alkyl ether and saturated cyclic ethers are only representative of the class of compounds which may be alkylated according to the process hereinafter set forth in greater detail, and that the present invention is not necessarily limited thereto.

Examples of suitable unsaturated hydrocarbons which may be utilized as the alkylating agents when treating the aforementioned ethers will preferably comprise olefinic hydrocarbons containing from 2 to about 20 carbon atoms such as ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene 1-nonadecene, eicosene, cyclopentene, cyclohexene, cycloheptene, etc. In addition to the aforementioned 1-alkenes and cycloalkenes it is also contemplated that other olefinic hydrocarbons such as 2-butene, 2-pentene, 2-hexene, 3-hexene, 2-heptene, 3-heptene, 4-heptene, 2-octene, 3-octene, 4-octene, 2-nonene, 3-nonene, 4-nonene, etc. as well as branched-chained olefins including isobutene, 2-methyl-1-butene, 2-methyl1-pentene, 2-methyl-1-hexene, 2-methyl-1-heptene, 3-methyl-1-pentene, 3-methyl-1-hexene, 3-methyl-1-heptene may also be used.

The alkylation of the alkylated ether or saturated cyclic ethers with an unsaturated hydrocarbon is effected in the presence of certain catalytic compositions of matter, said catalysts comprising a compound which will generate free radicals at the conditions of temperature and pressure under which the present reaction takes place. Examples of these catalysts will include in particular organic peroxy compounds containing the bivalent radical —O—O— which is capable of inducing the condensation reaction. The organic compounds which constitute a preferred class of catalysts for use in this invention will include peracetic acid, persuccinic acid, dimethyl peroxide, diethyl peroxide, dipropyl peroxide, di-t-butyl peroxide, butyryl peroxide, lauroyl peroxide, benzoyl peroxide, tetrahydronaphthalene peroxide, urea peroxide, t-butyl perbenzoate, t-butyl hydroperoxide, methylcyclohexyl hydroperoxide, cyclohexanone peroxide, cumene hydroperoxide, etc. It is also contemplated within the scope of this invention that organic peroxy compounds which are compounded commercially with various diluents for use as free-radical generating agents may be used and will include benzoyl peroxide compounded with calcium sulfate, benzoyl peroxide compounded with camphor, etc. Only catalytic amounts (less than stoichiometric amounts) are needed.

The reaction of the present process involving the aforementioned starting materials is effected at elevated reaction temperatures which should be at least as high as the initial decomposition temperature of the free-radical generating catalyst, such as the peroxide compound, in order to liberate and form free radicals which promote the reaction. In selecting a particular reaction temperature for use in the process of the present invention, two considerations must be taken into account. First sufficient energy by means of heat must be supplied to the reaction system so that the reactants, namely, the alkyl ether or saturated cyclic ether and the olefinic hydrocarbon will be activated sufficiently for radical transfer to take place when free radicals are generated by the catalyst. Second, free-radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135°C. and 1.7 hours at 145° C. (calculated from data for the first 33% decomposition). A reaction system temperature must then be selected so that the free-radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for conversion. When the half life of the free-radical generating catalyst is greater than 10 hours, radicals are not generated at a sufficient rate to cause the reaction to go forward at a sufficiently detectable rate. Thus, the reaction temperature may be within the range of from about 50° to about 300° C. and at least as high as the decomposition temperature of the catalyst, by which is meant a temperature such that the half life of the free-radical generating catalyst is not greater than 10 hours. Since the half life for each free-radical generating catalyst is different at different temperatures, the exact temperature to be utilized in a particular reaction will vary. However, persons skilled in the art are well acquainted with the half life vs. temperature data for different free-radical generating catalysts and thus, it is within the skill of one familiar with the art to select the particular temperature needed for any particular catalyst. However, the operating temmperatures generally do not exceed the decomposition temperature of the catalyst by more than about 150° C. For example, when a free-radical generating catalyst such as t-butyl perbenzoate is used having a decomposition temperature of approximately 115°C., the operating temperature of the process is from about 115° C. to about 265° C. When di-t-butyl peroxide having a decomposition temperature of about 130°C. is used, the process is run at a temperature ranging from about 130° to about 280° C. Higher reaction temperatures may be employed, but little is gained if the temperature is more than the hereinbefore mentioned 150°C. higher than said decomposition temperature of the catalyst.

In addition to the elevated temperatures which are utilized, the reaction may also be effected at elevated pressures ranging from about 1 to about 100 atmospheres or more, the preferred operating pressure of the process being that which is required to maintain a substantial portion of the reactants in liquid phase. Pressure is not an important variable in the process of this invention. However because of the low boiling points of some of the reactants, it is necessary to utilize pressure-withstanding equipment to insure liquid phase conditions. In batch type operations, it is often desirable to utilize pressure-withstanding equipment, to charge the reactants and the catalyst to the vessel, and to pressure the vessel with 10, 30, 50 or more atmospheres with an inert gas such as nitrogen. This helps to insure the presence of liquid phase conditions. However when the molar quantity of reactants is sufficient, the pressure which they themselves generate at the temperature utilized is sufficient to maintain the desired phase conditions Although the above discussion concerns the use of a compound containing a bivalent —O—O— radical, it is also contemplated within the scope of this invention that other free-radical generators may also be used to initiate the alkylation reaction. Some specific examples of these other free-radical generators will include organometallic compounds such as tetramethyllead, tetraethyllead, tetrapropyllead, etc. ultra-violet light, etc.

In addition to effecting the alkylation of the alkyl ether or saturated cyclic ether with an unsaturated hydrocarbon in the presence of a catalyst of the type hereinbefore set forth, the reaction is also effected in the presence of a promoter which comprises a hydrogen chloride compound. The aforementioned hydrogen chloride compound may be in an anhydrous or aqueous state. For example, when an aqueous hydrogen chloride compound is used, it may comprise hydrochloric acid in various concentrations, a preferred acid which is used in the process of this invention constituting concentrated hydrochloric acid which has a 38% concentration. The aforementioned hydrogen chloride compound is usually present in the reaction mixture in a quantity range from about 0;5;1 to about 4:1 weight percent of hydrogen chloride to the organic peroxy compound which is used as the catalyst.

The hydrogen chloride compound exhibits an unexpected and important effect. In its presence the monoalkylated compound is a major constituent of the product which is obtained. In its absence the product which is obtained consists chiefly of compounds formed by the reaction of more than one molecule of the olefin with one molecule of the ether; in other words, telomerization occurs rather than the simple addition of the olefin to the ether in equimolecular proportions.

The process of this invention may be effected in any suitable manner and may comprise either a batch or continuous type of operation. When a batch type operation is used, a quantity of the alkyl ether or saturated cyclic ether which is to undergo alkylation is placed in an appropriate apparatus along with the catalyst and the hydrogen chloride compound, a particularly suitable type of apparatus for this reaction comprising an autoclave of the rotating or mixing type. Alternatively, if the unsaturated hydrocarbon is in liquid form, it may also be placed in the apparatus alone with the aforementioned ether, catalyst and hydrogen chloride compound. The liner is sealed into the autoclave after which the autoclave is brought to the desired operating pressure. If the olefinic hydrocarbon is in a gaseous form, the presssure at which the reaction is effected may be provided for by the autogenous pressure of the olefin or, if so desired, the olefin may provide only a partial pressure of the desired operating pressure, the remainder being afforded by the introduction of a substantially inert gas such as nitrogen into the reaction zone. The apparatus and contents thereof are then heated to the desired operating temperature which is at least as high as the decomposition temperature of the free-radical generating compound which acts as the catalyst and preferably not greater than about 150° C. higher than the decompositon temperature. After maintaining the apparatus and contents thereof at the desired operating conditions of temperature and pressure for a predetermined residence time, which may range from about 0.5 up to about 10 hours or more in duration, heating is discontinued and the vessel and contents thereof are allowed to cool to room temperature. After reaching room temperature, the excess pressure is discharged, the apparatus is opened and the reaction mixture is recovered therefrom. The reaction mixture may then be subjected to conventional means of separation and purification including, but not limited to, filtration, extraction, washing, drying, distillation, etc. whereby the desired product comprising an alkylated alkyl ether or alkylated saturated cyclic ether may be separated and recovered from any starting material which may still be present.

It is also contemplated within the scope of this invention that the process for the alkylation of an alkyl ether or saturated cyclic ether may be effected in a continuous manner of operation. When such a type of operation is used, the ether and the olefinic hydrocarbon which acts as the alkylating agent are continuously charged to a reaction zone which is maintained at the proper operating conditions of temperature and pressure. In addition, the particular free-radical generating compound which acts as a catalyst for the reaction and the hydrogen chloride compound are also continuously charged thereto. The reactants and the catalyst may be charged to the reactor through separate lines, or if so desired, they may be admixed prior to entry into said reactor and charged thereto in a single stream. Upon completion of the desired residence time, the reactor effluent is continuously withdrawn and subjected to conventional means of separation of a type similar to those hereinbefore set forth whereby the desired products are recovered while any unreacted starting materials may be recycled to the reaction zone to form a portion of the feed stock.

The following examples are given to illustrate the process of the present invention which, however, are not intended to limit the generally broad scope of the present invention in strict accordance therewith.

EXAMPLE I

To the glass liner of a rotating autoclave was charged 85 g. (1.0 mole) of 1,4-dioxane, 6, g. of di-t-butyl peroxide, 18 g. of concentrated hydrochloric acid (38% concentration) and 17 g. of water. The glass liner was then sealed into the autoclave and ethylene pressed in until an initial operating pressure of 40 atmospheres was reached. The autoclave was heated to a temperature of 130° C. and maintained in a range of from 130° to 140° C. for a period of 8 hours, the maximum pressure at this temperature reaching 68 atmospheres. At the end of the 8-hour period, heating was discontinued and the autoclave allowed to return to room temperature, the final pressure at room temperature being 32 atmospheres. The excess pressure was discharged, the autoclave was opened and the product which comprised 82 g. of an upper organic layer and 62 g. of a lower aqueous layer was recovered. The two layers were separated, the upper layer was washed with water, and subjected to fractional distillation. The bottoms were recovered and subjected to preparative gas chromatography followed by infra-red analysis, said analyses disclosing the presence of 2-ethyl-1,4-dioxane.

EXAMPLE II

In this example the above experiment was repeated by charging 72 g. of 1,4-dioxane, 6 g. of di-t-butyl peroxide and 17 g. of concentrated hydrochloric acid to the glass liner of a rotating autoclave. The liner was sealed into the autoclave and 20 atmospheres of ethylene plus 20 atmospheres of nitrogen was charged to the autoclave. The autoclave was then heated to a temperature of 130° C. and maintained in a range of from 130° to 140° C. for period of 8 hours, the maximum pressure at this temperature reaching 57 atmospheres. At the end of the 8-hour period, heating was discontinued and the autoclave was allowed to return to room temperature, the final pressure at room temperature being 26 atmospheres. The excess pressure was discharged, the autoclave was opened and 199 g. of product comprising 154 g. of upper organic layer and 45 g. of lower aqueous layer were recovered. The two layers were separated and the upper layer was subjected to fractional distillation. The bottoms which were recovered were submitted to preparative gas chromatography followed by infra-red analysis. Three major peaks were present. The infra-red analysis of Peak 1 possessed strong bands at 615, 900, 1120, 1360, 1450, 2860 and 2960 cm$^{-1}$. There was a somewhat more intense band at 2960 cm$^{-}$$_1$ corresponding to CH and there was a methyl band at 1380 cm$^{-1}$, thus indicating the presence of ethyl-1,4-dioxane. The other two peaks indicated the presence of side products comprising bis-92-chlorethyl) ether and 2-chloroethyl 2-hydroxyethyl ether, respectively.

EXAMPLE III

In this example 141 g. (2.0 mole) of tetrahydrofuran along with 6 g. of di-t-butyl peroxide and 20 g. of concentrated hydrochloric acid were placed in the glass liner of a rotating autocalve. The autoclave was sealed and ethylene pressed in until an intial operating pressure of 30 atmospheres was reached. Thereafter the autoclave was heated to a temperature of 130° C. and maintained in a range of from 130° to 140° C. for a reaction period of 4 hours, the maximum pressure at this temperature reaching 35 atmospheres. At the end of the 4-hour period, heating was discontinued and the autoclave was allowed to return to room temperature. Upon reaching room temperature the excess pressure was discharged, the autoclave was opened and the reaction mixture was recovered therefrom. After separation of the organic layer from the aqueous layer the former was washed with water and subjected to fractional distillation. The product boiling chiefly at 105° to 115° C. was subjected to preparative gas chromatography followed by analysis by infrared and nuclear magnetic resonance spectra which showed that 2-ethyltetrahydrofuran was the principal product. There was obtained at 22 mole percent yield of 2-ethyletetrahydrofuran which comprised 47 percent by weight of the reaction products.

When the experiment set forth in the above paragraph was repeated in the absence of hydrochloric acid, the desired product comprising 2-ethyltetrahydrofuran was obtained in less than a 5 percent yield; it comprised only 20 percent by weight of the reaction products. Thus it is evident from a comparison of the two experiments with tetrahydrofuran that the presence of hydrogen chloride in the reaction mixture markedly increases the yield of the desired product, namely, the monoethylated ether.

EXAMPLE IV

In this example 61 g. (0.5 mole) of n-butyl ether along with 6 g. of di-t-butyl peroxide and 25 g. of concentrated hydrochloric acid was treated in a manner similar to that set forth in the above examples, that is, the above compounds were placed in the glass liner of a rotating autoclave and ethylene was pressed in until an initial operating pressure of 20 atmospheres was reached after which 20 atmospheres of nitrogen was added. The autoclave was heated to a temperature of 130° C. and maintained in a range of from 130° to 140° C. for a period of 4 hours. During this 4-hour period, the maximum pressure rose to 55 atmospheres. At the end of the 4-hour period, heating was discontinued, the autoclave was allowed to return to room temperature and the excess pressure was discharged therefrom. The autoclave was opened, the reaction mixture was recovered and the organic layer was separated from the aqueous layer. The organic layer after being washed with water was subjected to fractional distillation and the bottoms which are recoved therefrom are submitted to preparative gas chromatography followed by infra-red and nuclear magnetic resonance analysis. These analyses disclosed the presence of the desired product comprising butyl hexyl ethers.

EXAMPLE V

To the glass liner of a rotating autoclave is charged 100 g. (0.9 mole) of methyl cyclohexyl ether along with 6 g. of benzoyl peroxide and 25 g. of concentrated hydrochloric acid. The liner is sealed into the autoclave and ethylene is pressed in until an initial operating pressure of 40 atmospheres is reached. The autoclave is then heated to a temperature of 80° C. and maintained in a range of from 80° to 90° C. for a period of 6 hours, the maximum pressure at this temperature reaching approximately 50 atmospheres. At the end of this period, heating is discontinued, the autoclave is allowed to return to room temperature and the excess pressure is discharged therefrom. The autoclave is opened, the reaction mixture is recovered and the upper organic layer is separated from the lower aqueous layer. After fractionation of the upper layer, the bottoms are submitted to preparative gas chromatography followed by infrared analysis, these analyses disclosing the presence of the desired product comprising methyl 1-ethylcyclohexyl ether.

EXAMPLE VI

To the glass liner of a rotating autoclave is charged 86 g. (1.0 mole) of tetrahydropyran, 6 g. of benzoyl peroxide, 20 g. of concentrated hydrochloric acid (38% concentration) and 15 g. of water. The liner is sealed into the autoclave and pressured with 20 atmospheres of propylene and 20 atmospheres of nitrogen. The autoclave is heated to a temperature of 80° C. and maintained in a range of from 80° to 90° C. for a period of 8 hours, the maximum pressure rising to approximately 60 atmospheres. At the end of the 8-hour period, heating is discontinued, the autoclave is allowed to return to room temperature and the excess pressure is discharged therefrom. After opening the autoclave and recovering the reaction mixture, the organic layer is separated from the aqueous layer, washed with water and subjected to fractional distillation. The bottoms are submitted to preparative gas chromatography followed by infra-red analysis. This analysis will disclose the presence of the desired product comprising 2-n-propyltetrahydropyran.

I claim as my invention:

1. A process for the alkylation of an alkyl or saturated cyclic ether consisting of carbon, hydrogen and oxygen atoms and having at least one hydrogen atom attached to a primary or secondary carbon atom and containing no functional groups other than the ether linkage, comprising the steps of reacting said ether with 1-alkene having from 2 to 20 carbon atoms in the presence of an organic peroxy compound selected from the group consisting of peracetic acid, persuccinic acid, dimethyl peroxide, diethyl peroxide, dipropyl peroxide, di-t-butyl peroxide, butyryl peroxide, lauroyl peroxide, benzoyl peroxide, tetrahydronaphthalene peroxide, urea peroxide, t-butyl perbenzoate, t-butyl hydroperoxide, methylcyclohexyl hydroperoxide, cyclohexanone peroxide, and cumene hydroperoxide and also in the presence of hydrogen chloride in amount of from about 0.5:1 to about 4:1 weight percent of said organic peroxy compound, said ether and 1-alkene being reacted at a temperature in the range of from about 50° to about 300°C. and at least as high as the decomposition temperature of said organic peroxy compound and a pressure of from about 1 to about 100 atmospheres, and recovering the resultant alkylated ether.

2. The process as set forth in claim 1 in which said hydrogen chloride is in the form of concentrated hydrochloric acid.

3. The process as set forth in claim 1 in which said 1-alkene is ethylene.

4. The process as set forth in claim 2 in which said organic peroxy compound is di-t-butyl peroxide.

5. The process as set forth in claim 2 in which said ether is 1,4-dioxane, said 1 alkene is ethylene and said alkylated ether is 2-ethyl-1,4-dioxane.

6. The process as set forth in claim 2 in which said ether is tetrahydrofuran, said 1 alkene is ethylene, and said alkylated ether is 2-ethyltetrahydrofuran.

7. The process as set forth in Claim 2 in which said ether is methyl cyclohexyl ether, said 1 alkene is ethylene, and said alkylated ether is methyl 1-ethylcyclohexyl ether.

8. The process as set forth in claim 2 in which said ether is n-butyl ether, said 1 alkene is ethylene, and said alkylated ether is a mixture of butyl hexyl ethers.

9. The process as set forth in claim 2 in which said ether is pyran, said 1 alkene is propylene, and said alkylated ether is 2-n-propyltetrahydropyran.

* * * * *